United States Patent Office 2,713,810
Patented July 26, 1955

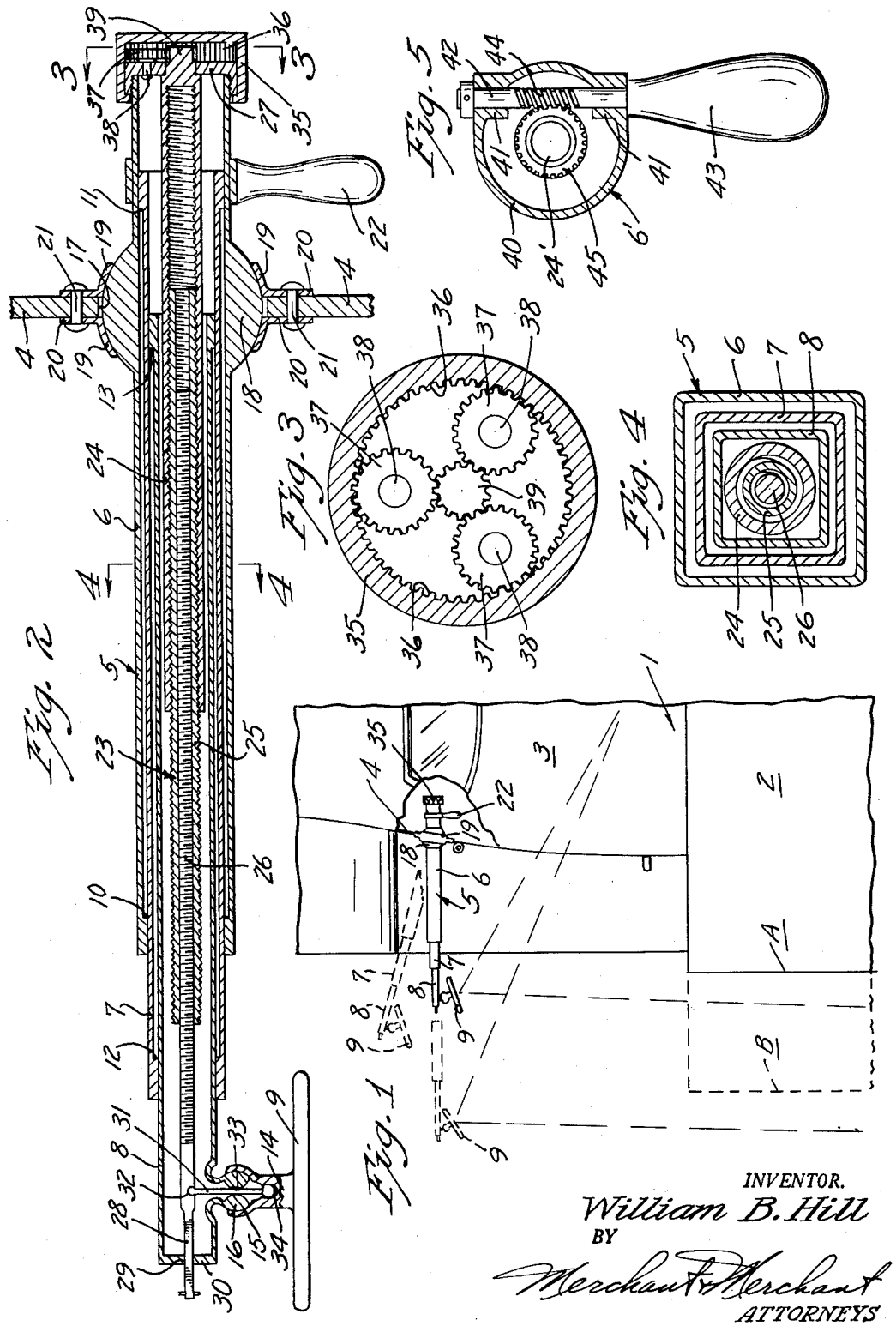

2,713,810

ADJUSTABLE REAR VIEW MIRRORS FOR VEHICLES

William B. Hill, Minneapolis, Minn., assignor to E-Z Products, Inc., Mankato, Minn., a corporation of Minnesota Application April 17, 1953, Serial No. 349,478

5 Claims. (Cl. 88—93)

My invention relates generally to rear view mirrors for automotive vehicles, and more specifically, to means for mounting rear view mirrors on automotive vehicles such as trucks or the like.

An important object of my invention is the provision of a rear view mirror which, when mounted on the cab of a truck or the like, may be extended or retracted laterally of the truck from the inside of the cab.

Another object of my invention is the provision of a rear view mirror which may be moved forwardly and rearwardly and in vertical directions and tilted in a manner to be adjusted to the operator's vision from a position inside of the cab of the vehicle.

Another object of my invention is the provision of a rear view mirror, as set forth, in which the mechanism on the inside of the cab occupies a minimum space so as to avoid obstruction of the operator's view of the road.

Another object of my invention is the provision of a rear view mirror of the above type which is efficient in operation and which is rugged in construction and durable in use.

The above and other highly important objects and advantages of my invention will become apparent from the following detailed specification, appended claims, and attached drawings.

Referring to the drawings, which illustrate the invention, and in which like characters indicate like parts throughout the several views:

Fig. 1 is a fragmentary diagrammatic view in plan of an automotive truck showing my novel rear view mirror mounted thereon;

Fig. 2 is an axial section taken through my novel rear view mirror and illustrating in detail the means for mounting the same to a truck body;

Fig. 3 is an enlarged transverse section taken on the line 3—3 of Fig. 2;

Fig. 4 is an enlarged transverse section taken on the line 4—4 of Fig. 2; and

Fig. 5 is a view corresponding to Fig. 3 but showing a modified arrangement of the invention.

Referring with greater detail to the drawings, the numeral 1 indicates a conventional automotive vehicle such as a truck having a load-carrying body 2 and an operator's cab 3, a side wall of which is indicated at 4.

My novel rear view mirror comprises an extendible and retractable arm 5 made up of an outer arm section 6, an intermediate extension arm section 7, and an inner extension arm section 8, and a rear view element 9. The arm sections 6, 7 and 8 are preferably cross-sectionally rectangular tubes, the intermediate and inner sections thereof being telescopically received within the outer section 6. At its outer end, the outer section 6 is formed to provide a stop shoulder 10 which is engageable with a cooperating stop shoulder 11 on the inner end of the intermediate section 7 to limit extending movements of the intermediate section 7. Similar means for limiting outward movement of the inner section 8 with respect to the intermediate section 7 comprises a shoulder 12 on the outer end portion of the intermediate arm section 7 and a cooperating shoulder 13 on the inner end portion of the inner extension arm section 8. The mirror element 9 is provided with a mounting stem 14 which terminates in a socket 15 in which is received a ball 16 which extends laterally outwardly from the outer end portion of and is formed as part of the inner extension arm section 8. The ball and socket joint 15—16 permits swinging movement of the mirror element 9 relative to the arm 5.

The outer arm 5 is adapted to extend through an aperture 17 in the wall 4 of the truck body and is mounted for universal swinging and rotary movement therein by means now to be described. The arm 5 near its inner end is provided with an integrally formed diametrically enlarged cross-sectionally spherical element 18 of slightly less diameter than that of the opening 17 in the wall of the body. A pair of like socket-forming members 19 engage spaced portions of the spherical element 18 on opposite sides of the wall 4 and are provided with flanges 20 that are secured to opposite sides of the wall 4 by rivets or the like 21, see Fig. 2. Between the spherical element 18 and the inner end of the arm section 6 is a handle 22 rigidly secured thereto and by means of which the arm 5 may be manipulated so as to bring the mirror element 9 into a position of highest operative efficiency.

When the truck 1 is carrying a load that projects laterally outwardly a minimum distance, as shown by full lines and indicated by A in Fig. 1, the telescoping arm 5 is reduced in length to an extent wherein an adequate view to the rear is obtained but wherein the mirror is not projected laterally outwardly so far as to create a traffic hazard. On the other hand, when a load of maximum width, as illustrated by dotted lines in Fig. 1 and indicated by B, is carried by the truck 1, the arm 5 is extended laterally of the truck, also as shown by dotted lines in Fig. 1, to permit adequate rear vision from the operator's seat. I provide novel means for extending and retracting the arm extension sections 7 and 8 in the nature of a screw device 23 contained within the arm 5. The screw device 23 includes concentric outer, intermediate, and inner screw sections, indicated at 24, 25, and 26 respectively. The outer screw section 24 is in the nature of an internally threaded tube and is journalled at its inner end to a fixed end plate or cap 27 that is screw-threaded or otherwise rigidly secured to the inner end of the outer arm section 6. The intermediate screw section 25 is likewise tubular and is both externally and internally threaded, the external threads thereof engaging the internal threads of the outer screw section 24, see Figs. 2 and 4. The inner screw section 26 is preferably in the nature of a solid rod having external threads which engage the internal threads of the intermediate screw section 25. Said inner screw section 26 is integrally formed at its outer end with a longitudinally extended cross-sectionally non-circular, preferably rectangular, key 28 which extends longitudinally outwardly through a keyway in the nature of an opening 29 in the outer end 30 of the inner arm section 8. The keyway opening 29 is similar in cross-section to the key 28 and permits longitudinal sliding movements of the inner screw section 26 respective to the inner arm section 8 but prevents relative rotary movement therebetween. It should here be noted that the rectangular shape of the several arm sections comprising the arm 5 are restrained against rotary movement relative to each other by the cross-sectionally rectangular shape thereof. A lever in the nature of a rigid coupling link 31 has its inner end contained within a laterally opening recess 32 in the inner screw section 26. The link 31 extends through and is fulcrumed intermediate its ends in a suitable aperture 33 extending through the ball 16 and has its outer end contained within a recess 34 in the stem 14 of the mirror element 9.

From the above, it should be obvious that rotation of the outer screw section 24 in one direction will cause the inner screw section 26, which is held against rotation, to move outwardly, causing the mirror element 9 to swing in a direction generally longitudinally inwardly with respect to the arm 5 or toward the truck 1. After the mirror element 9 has moved to its limit of swinging movement in this direction, continued rotation of the screw section 24 will cause the arm sections 7 and 8 to move laterally outwardly of the truck body so that the arm 5 is extended, as indicated by dotted lines in Fig. 1. Control means for imparting rotation to the outer screw section 24 comprises a manually operated rotary member and suitable connections therebetween and the outer screw section of the screw device. In the preferred embodiment of the invention illustrated in Figs. 1-4 inclusive, the manually operated control means comprises a rotary shell-like member 35 journalled on the end plate or cap 27. The member 35 is provided with internal gear teeth which provide a ring gear 36 that has meshing engagement with a plurality of circumferentially spaced idler gears 37 journalled on the shafts 38 that are rigidly mounted in and extend axially from the end plate 27. The idler gears 37 also have meshing engagement with a pinion 39 formed as an integral part of the inner journalled end of the outer screw section 24.

It should be noted that the frictional contact between the several component parts of the arm 5 exert a sufficient frictional drag upon each other to insure swinging movement of the mirror element 9 to one extreme limit or the other of its movement before any extending or retracting movement is imparted to the extension arm sections 7 and 8. This arrangement permits adjustment of the mirror element 9 about its axis of swinging movement after the arm 5 has been extended or retracted in the desired amount without causing further extending or retracting movements during said adjustment of the mirror element. The longitudinal adjustment of the arm 5, the angular adjustment of the mirror element 9 with respect to the arm 5, and the universal rotary and swinging movement of which the arm is capable, by reason of the spherical mounting 18—19, permits the operator of the vehicle to quickly and easily set the mirror at any desired elevation or position laterally of the cab 3 as well as angularly forwardly or rearwardly with respect to a plane extending transversely of the cab through the universal connection 18—19, without opening the window of the cab and with a minimum of effort and time.

In the modified arrangement illustrated in Fig. 5, an outer arm section 6', identical in most respects to the outer arm section 6 of Figs. 1-4 inclusive, is formed to provide a rear end portion 40 having a pair of aligned bearings 41 in which is journalled a shaft 42 terminating at one end in a handle member 43. The shaft 42 is formed to provide a worm 44 which has meshing engagement with a worm wheel 45 fast on the inner end of an outer rotary screw section 24' similar to the screw section 24 of Figs. 1-4 inclusive. In this form of the invention, the handle member 43 is designed to supplant the handle member 22 and the control member 35 of Figs. 1 and 2. Thus the handle member 43 may be used to swing the arm 5 to its desired position and rotated to cause extension or retraction of the arm 5 and adjustment of the mirror element 9 relative thereto.

While I have shown and described a commercial embodiment and a single modification of my improved rear view mirror construction, it will be understood that the same is capable of further modification without departure from the spirit and scope of the invention, as defined in the claims.

What I claim is:

1. A rear view mirror for automotive vehicles, said mirror comprising a tubular arm section, means mounting said arm section near its inner end for universal rotary and swinging movements through a wall of said vehicle, a tubular extension section telescopically mounted in said arm section for extending and retracting movements outwardly of said vehicle, a mirror element, means mounting said mirror element on the outer end of said extension section for swinging movements in directions generally longitudinally of the extension section, a screw device in said tubular arm section, said screw device comprising cooperating relatively fixed and rotary screw sections, said relatively fixed section being connected at one end to the extension section and the mirror element, said rotary screw section being journalled at its inner end portion in the inner end of said arm section, and control means including a rotary member on the inner end of said arm section and a gear train internally of said rotary member, said gear train connecting said rotary member with said rotary screw section, whereby to impart movement of said rotary member to said screw device.

2. The structure defined in claim 1 in which said gear train comprises a ring gear in said rotary member, a pinion on the inner end of the rotary screw section, and an idler gear intermeshing with said ring gear and pinion.

3. A rear view mirror for automotive vehicles, said mirror comprising an extendible and retractable arm made up of concentric telescoping outer, intermediate, and inner cross-sectionally rectangular tubular arm sections, means mounting said outer arm section near its inner end for universal rotary and swinging movements through a wall of a vehicle, stop means limiting longitudinal movements of said sections relative to each other, a mirror element, means mounting said mirror element to the outer end portion of said inner arm section for swinging movements in directions generally longitudinally of said arm, a screw device concentric with said arm and including concentric outer, intermediate, and inner screw sections, said outer screw section being journalled at its inner end to the inner end of said outer arm section, the longitudinally outer end of said inner arm section being provided with a keyway, the adjacent end of said inner screw section being provided with an integrally formed longitudinally outwardly projecting key slidable in said keyway for locking said inner screw section against rotation with respect to said inner arm section, means coupling said mirror element to said inner screw section to swinging movements of said mirror element, a manually operated rotary member journalled on the inner end of said outer arm section, a ring gear in said rotary member, a pinion on the inner end of said outer screw section, and an idler gear journalled on the inner end of said outer arm section and having intermeshing engagement with said ring gear and pinion whereby rotary movement of said rotary member is transferred to said outer screw section.

4. A rear view mirror for automotive vehicles, said mirror comprising an extendible and retractable arm made up of concentric telescoping outer, intermediate, and inner cross-sectionally rectangular tubular arm sections, means mounting said outer arm section near its inner end for universal rotary and swinging movements through a wall of a vehicle, stop means limiting longitudinal movements of said sections relative to each other, a mirror element, means mounting said mirror element to the outer end portion of said inner arm section for swinging movements in directions generally longitudinally of said arm, a screw device concentric with said arm and including concentric outer, intermediate, and inner screw sections, said outer screw section being journalled at its inner end to the inner end of said outer arm section, the longitudinally outer end of said inner arm section being provided with a keyway, the adjacent end of said inner screw section being provided with an integrally formed longitudinally outwardly projecting key slidable in said keyway for locking said inner screw section against rotation with respect to said inner arm section, means coupling said mirror element to said inner screw section and transferring longitudinal movements of said inner screw section to swinging movements of said mirror element, a shaft extending transversely through and journalled in the inner end portion of said outer arm section, said shaft terminating at one end in a handle member, a worm on said shaft, and a cooperating worm wheel fast on the inner end of said outer screw section, rotation of said handle member being transferred to said outer screw section by said worm and worm wheel.

5. A rear view mirror for automotive vehicles, said mirror comprising a tubular arm section, means mounting said arm section for rotary movements in a wall of said vehicle, a tubular extension section telescopically mounted in said arm section for extending and retracting movements outwardly of said vehicle, a mirror element, means mounting said mirror element on the outer end of said extension section for swinging movements in directions generally longitudinally of the extension section, a screw device in said tubular arm section, said screw device comprising cooperating relatively fixed and rotary screw sections, said relatively fixed section being connected at one end to the extension section and the mirror element, said rotary screw section being journalled at its inner end portion in the inner end of said arm section, and control means including a rotary member on the inner end of said arm section and a gear train internally of said rotary member, said gear train connecting said rotary member with said rotary screw section, whereby to impart movement of said rotary member to said screw device.

References Cited in the file of this patent
UNITED STATES PATENTS

| | | |
|---|---|---|
| 2,260,597 | Beattie | Oct. 28, 1941 |
| 2,281,234 | Clark et al. | Apr. 28, 1942 |
| 2,315,260 | Lancaster | Mar. 30, 1943 |
| 2,341,208 | Clark et al. | Feb. 8, 1944 |
| 2,570,536 | Fellabaum | Oct. 9, 1951 |
| 2,585,308 | Goldstein | Feb. 12, 1952 |
| 2,620,708 | Anderson | Dec. 9, 1952 |
| 2,644,363 | Capitani | July 7, 1953 |